No. 651,985. Patented June 19, 1900.
A. B. WALTON.
ELECTRIC ARC LAMP.
(Application filed Dec. 21, 1899.)
(No Model.) 7 Sheets—Sheet 1.
-FIG.I-
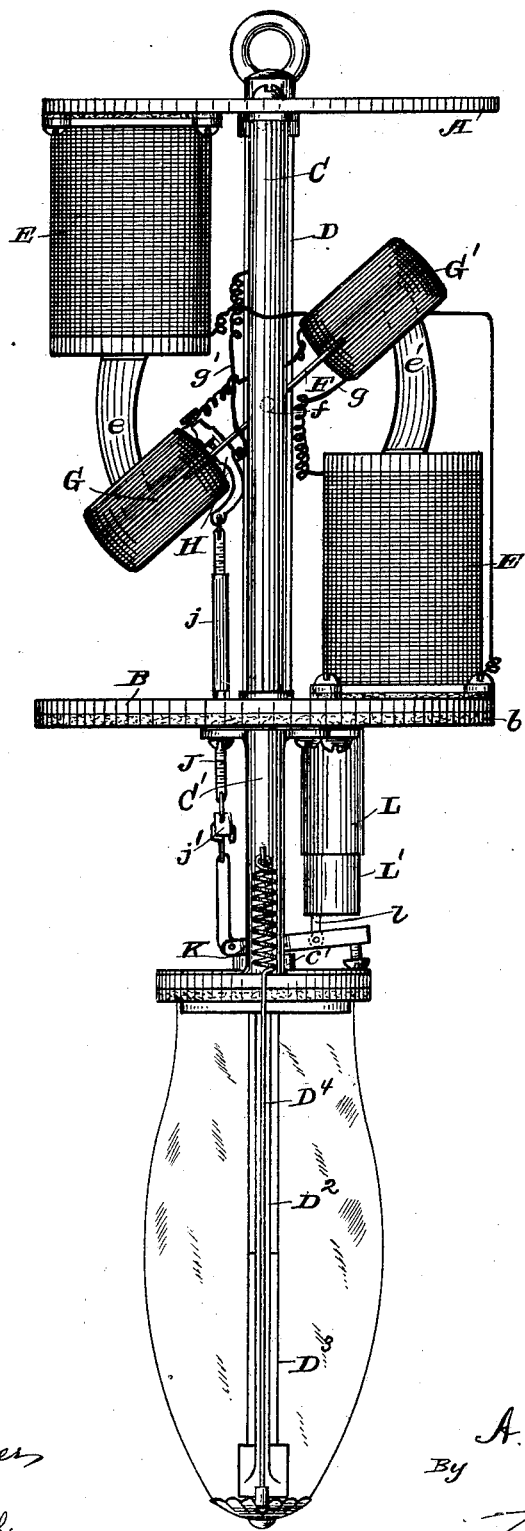

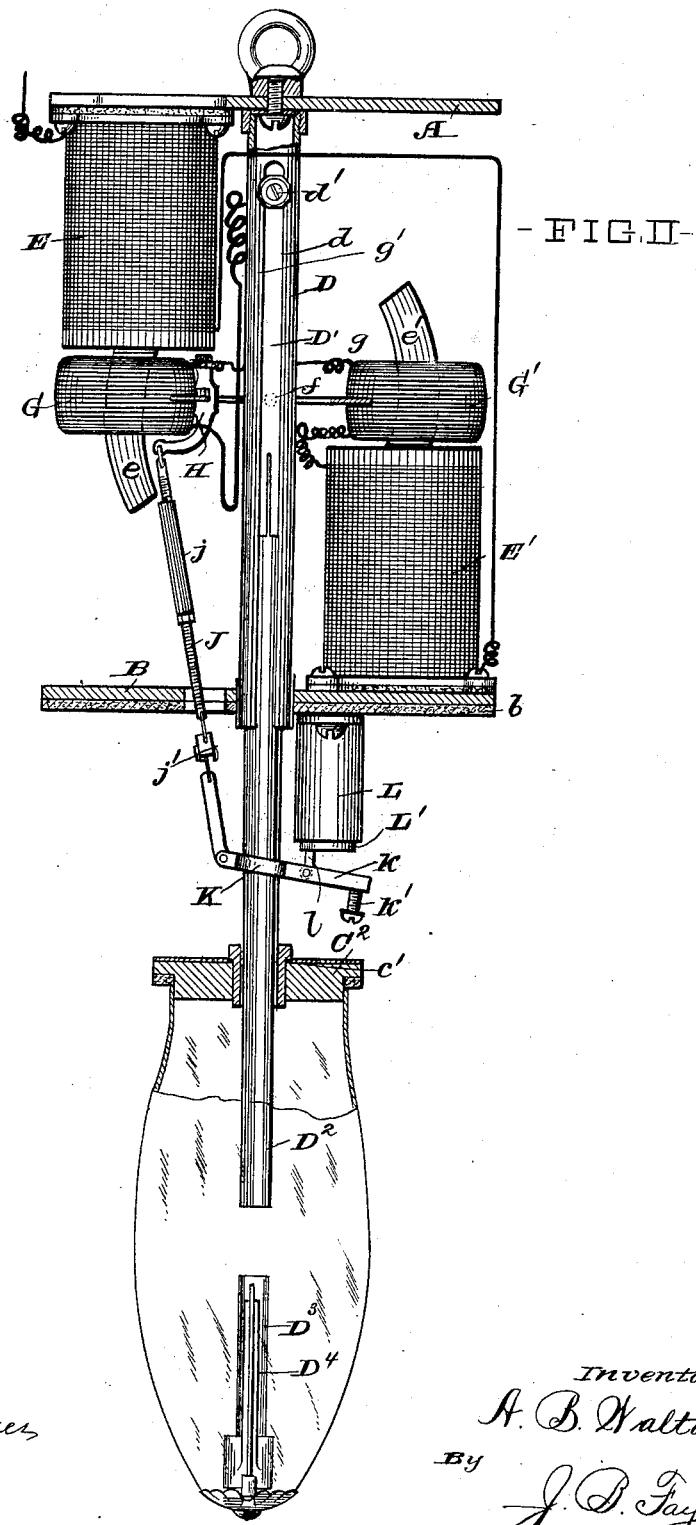

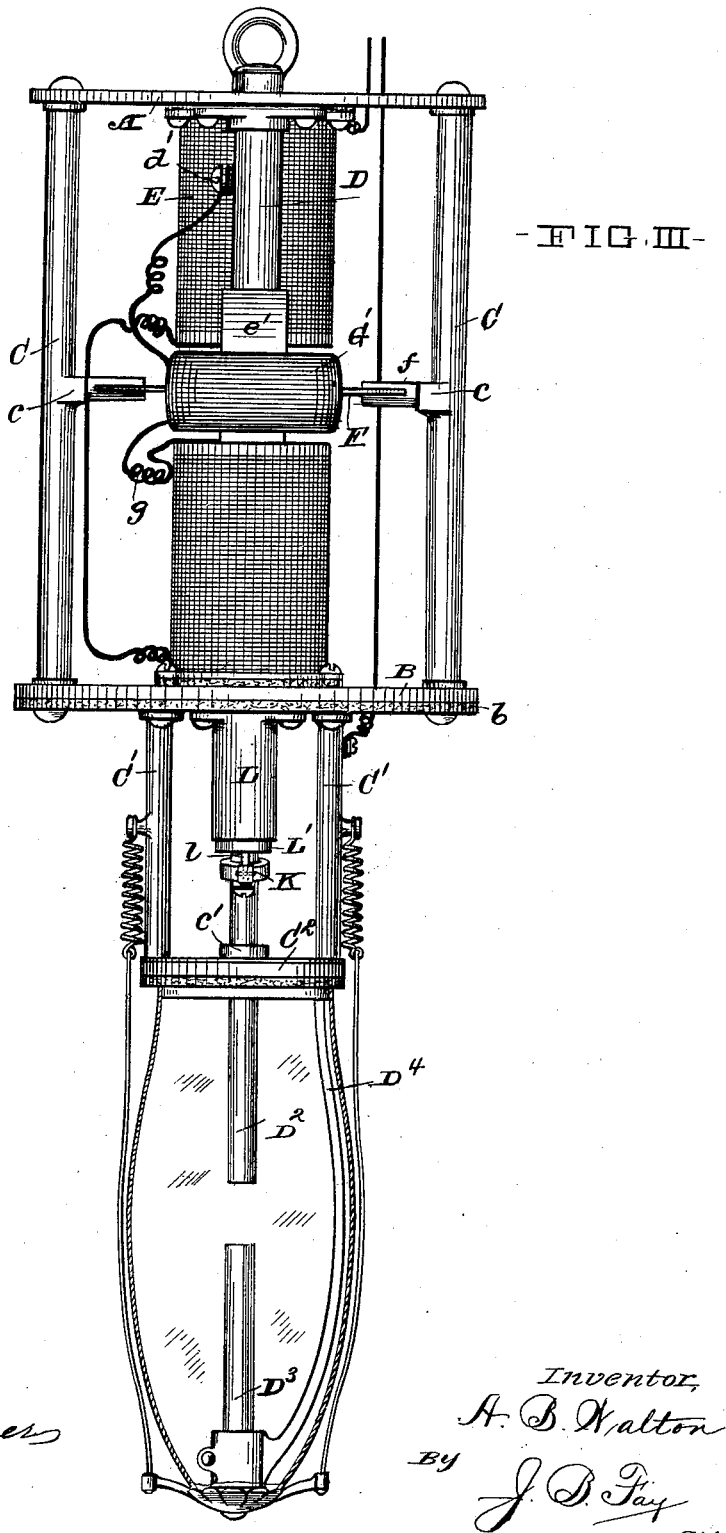

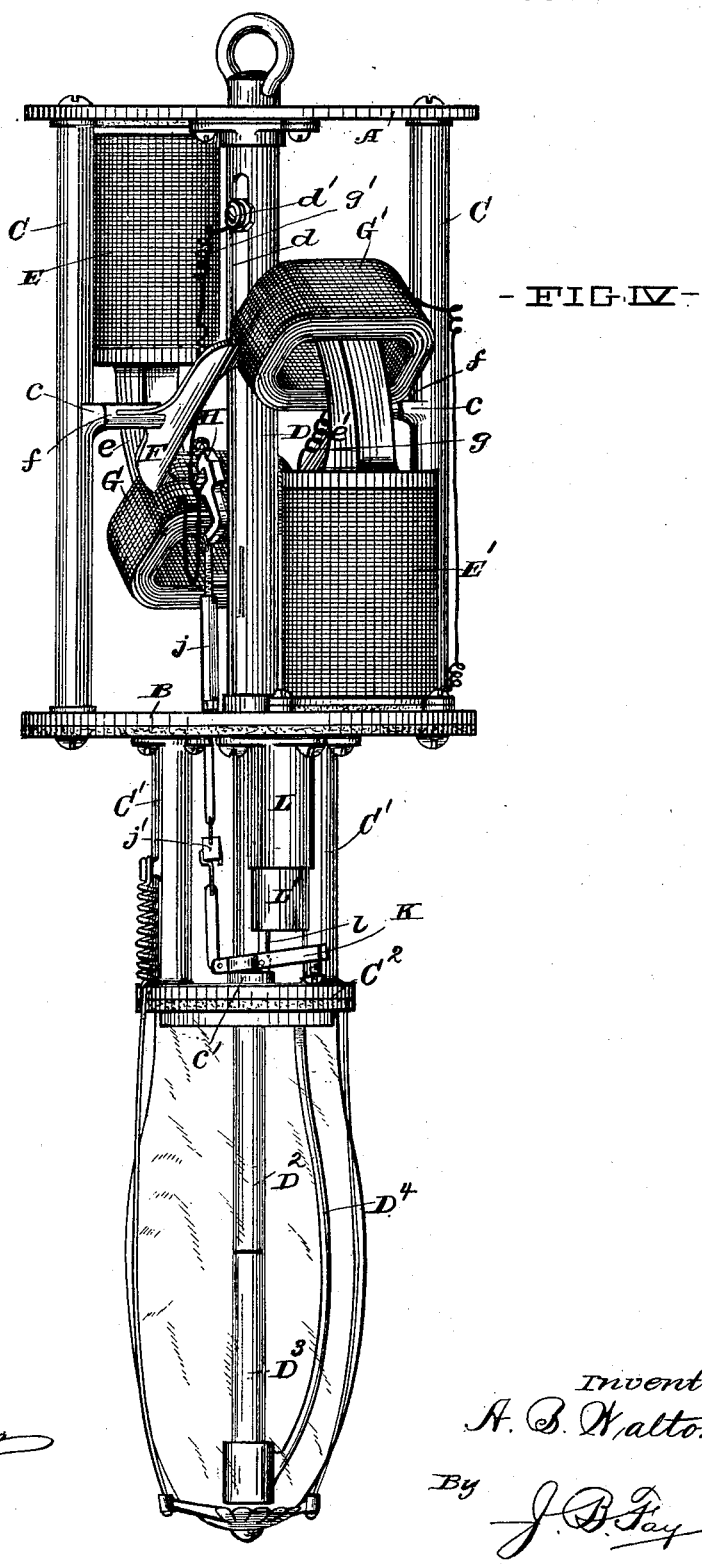

No. 651,985. Patented June 19, 1900.
A. B. WALTON.
ELECTRIC ARC LAMP.
(Application filed Dec. 21, 1899.)
(No Model.) 7 Sheets—Sheet 5.
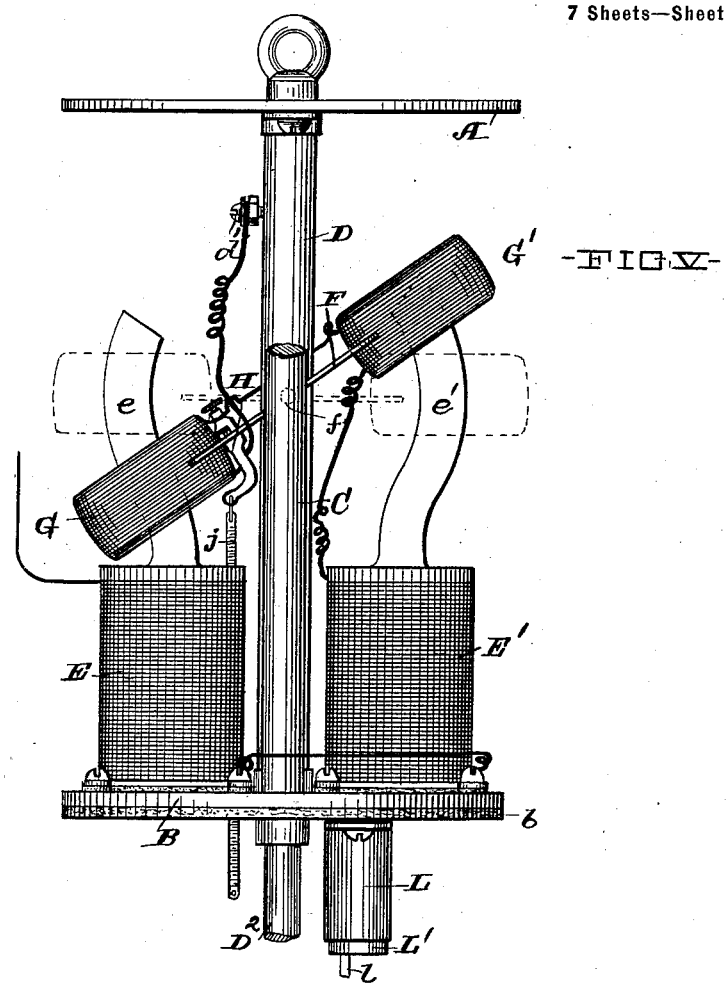
FIG. V.
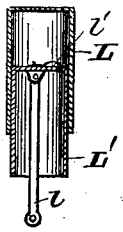
FIG. VI.
Witnesses,
J. C. Turner
A. E. Merkel
Inventor,
A. B. Walton
By J. D. Fay
Atty No. 651,985. Patented June 19, 1900.
A. B. WALTON.
ELECTRIC ARC LAMP.
(Application filed Dec. 21, 1899.)
(No Model.) 7 Sheets—Sheet 6.
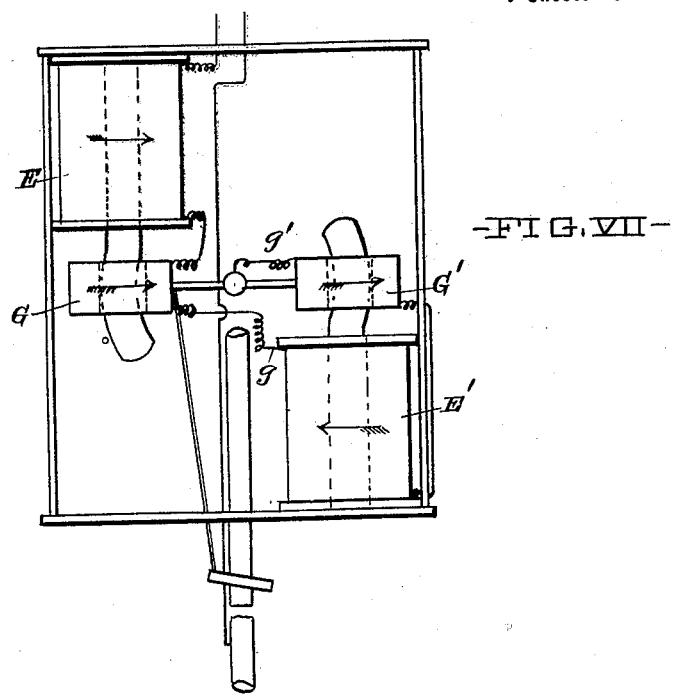
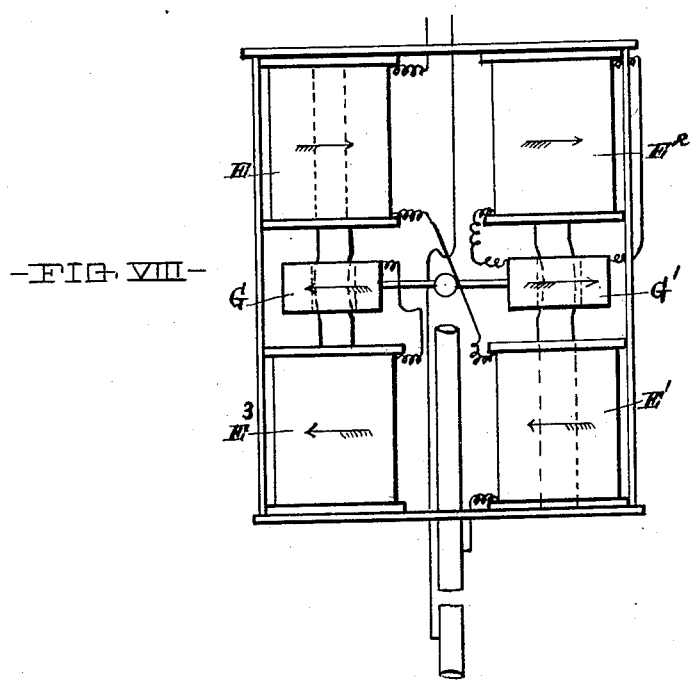

No. 651,985. Patented June 19, 1900.
A. B. WALTON.
ELECTRIC ARC LAMP.
(Application filed Dec. 21, 1899.)
(No Model.) 7 Sheets—Sheet 7.
-FIG IX-
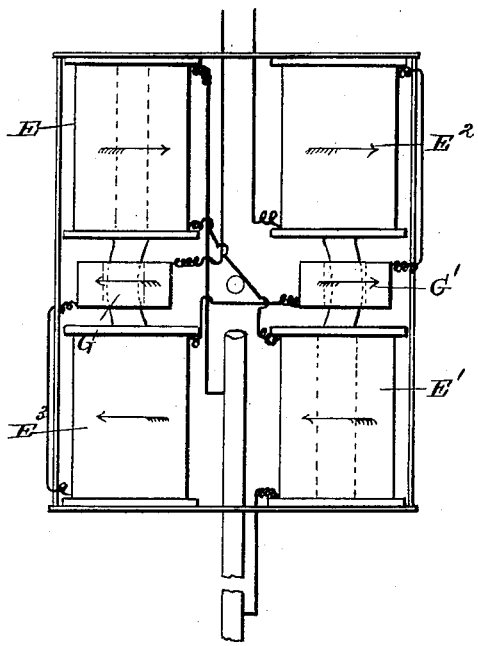
Witnesses
J. C. Turner
A. C. Merkel
Inventor,
A. B. Walton
By
J. B. Fay Atty

UNITED STATES PATENT OFFICE.

ALLYN B. WALTON, OF LORAIN, OHIO, ASSIGNOR TO THE NATIONAL VAPOR STOVE AND MANUFACTURING COMPANY, OF SAME PLACE.

ELECTRIC-ARC LAMP.

SPECIFICATION forming part of Letters Patent No. 651,985, dated June 19, 1900.

Application filed December 21, 1899. Serial No. 741,086. (No model.)

*To all whom it may concern:*

Be it known that I, ALLYN B. WALTON, a citizen of the United States, and a resident of Lorain, county of Lorain, and State of Ohio, have invented a new and useful Improvement in Mechanism for Converting Electrical Energy into Mechanical Movement, of which the following is a specification, the principle of the invention being herein explained and the best mode in which I have contemplated applying that principle, so as to distinguish it from other inventions.

My invention relates to mechanism for converting electrical energy into mechanical movement; and it consists of means hereinafter fully described.

The annexed drawings and the following description set forth in detail certain mechanism embodying the invention, such disclosed means constituting but one of various mechanical forms in which the principle of the invention may be used.

In said annexed drawings, Figure I represents a front view of my invention as especially adapted and applied to arc-lamps, showing such lamp with its jacket removed so as to expose the interior mechanism clearly to view, the various movable parts being shown in the positions assumed at a time when no current is flowing through the lamp-circuit. Fig. II represents a view similar to that shown in Fig. I, showing, however, the said movable parts in positions assumed at a time when current is flowing through the lamp-circuit. Fig. III represents a side view of the lamp as shown in Fig. II. Fig. IV represents a perspective view of the lamp as shown in Fig. I. Fig. V represents a front view of a modified form of my improved lamp mechanism. Fig. VI represents an axial section of a piston and cylinder utilized in and a part of my improvement. Figs. VII, VIII, and IX represent diagrammatic views of various connections and modifications capable of being made in the application of my improved mechanism to conform to conditions required by currents of different characters.

Two supporting-plates—an upper A and a lower B—are joined and rigidly secured relatively to each other by means of suitable posts C C, Fig. III, and form the frame for the support of the lamp mechanism. A tube D is secured to the central portion of the lower face of the upper plate A, extends downwardly, its lower end being open and projecting through the central portion of the lower plate B. A longitudinal slot $d$ is cut through the shell of said tube. A carbon-holder D', provided with a binding-screw $d'$, through the medium of which connection is made with the carbon $D^2$, is secured in said holder, said screw sliding freely in said slot $d$. Upon the lower surface of the upper plate A and upon the upper surface of the lower plate B are secured two coils E and E', respectively, each provided with a laminated iron core $e$ and $e'$, respectively extending in opposite directions from said coils and of curved formation, as shown in Fig. II. A rocker arm or frame F is provided with two journals $ff$, Fig. IV, which are supported in bearings $c\ c$, formed upon or secured to the posts C C, the axis of said journals passing through a point equidistant from the extremities of said frame. Two hollow coils G G' of equal weight are respectively supported upon the said frame extremities and are located equidistantly from said journal-axis. The arm or frame supporting said two coils is of a length and location and the curvature of cores $e$ and $e'$ are such that the circumference of a circle having its center on the frame-axis will pass through the axes of the said cores and the axes of said hollow coils G and G'. It is thus seen that said coils may be caused to simultaneously approach or recede from the ends of coils E and E' in the direction of the core-axis, surrounding said cores during such approach or recession. Secured to and depending from the side of said frame adjacent to the downwardly-extending core $e$ is a hanger H, to the lower extremity of which is secured one end of a connecting-rod J, which is provided with a turnbuckle $j$, whereby its length may be varied. Said rod extends downwardly through a suitable aperture cut in plate B and is secured at its lower end to a ring-clutch K, which grips the upper carbon $D^2$ in a manner hereinafter described, the rod and clutch, however, being insulated from each other by means of insulator $j'$.

Upon the side of the clutch opposite that to which the rod J is connected is formed an extension or tailpiece $k$, to which is secured intermediately of its extremity and the ring of the clutch the lower end of a rod $l$, said rod being pivoted, Fig. VI, upon a plunger L', open below and operating in a dash-pot L, closed at its upper end, depending from and secured to the lower surface of plate B, as shown in Fig. II, suitable insulation $b$ being placed between said dash-pot and plate. Said plunger is provided with a relief-valve $l'$, Fig. VI, which closes during the upward stroke and opens during the downward stroke. The outer diameter of the plunger is made slightly less than the inner diameter of the dash-pot, whereby a narrow annular space is left between the contiguous cylindrical surfaces.

Supported by means of hanger-posts C' C' is a globe-cap $C^2$, one of said posts being electrically connected with a conductor $D^4$, supporting the lower carbon $D^3$, the upper carbon extending through said cap and insulated therefrom by means of a lava bushing $c'$.

The mechanical construction of the regulating mechanism and its mechanical connection with the lamp to which it is shown to be applied having been described, I will now describe the method of winding the coils and making the connections in the circuit, including the lamp and said mechanism. Such connections may be made to conform with requirements necessitated by the characteristics of the various kinds of currents and circuits which it may be desirous of employing. When the mechanism is to be used in multiple circuits carrying alternating or continuous currents of constant potential, the windings and connections are arranged as follows: The stationary coils E and E' and movable or operating coils G and G' are connected in series, diagrammatic view, Fig. VII, illustrating one method of so connecting the coils—that is, one terminal of coil E is connected with one terminal of the line and the other with one terminal of coil G. The other terminal of coil G is connected with one terminal of coil E' by means of a flexible conductor $g$, the other terminal of which is connected with one terminal of coil G'. The other terminal of coil G' is connected by means of a flexible conductor $g'$ to the upper carbon, the lower carbon being suitably connected with the other terminal of the line. Coils E and G are so wound as to cause the current to flow in each in the same direction, and coils E' and G' are similarly wound, so as to cause the current to also travel in said coils in the same direction, as indicated by the arrows in said Fig. VII.

It is thus seen that the above-described arrangement is such as to make of the coils E and G a single or divided coil and similarly to make of coils E' and G' a single or divided coil. Each such divided coil hence consists of a stationary and a movable portion. The two coil portions G and G' being of equal weight are respectively counterbalanced and hence are caused to recede from their respective stationary coil portions when no current is passing through the lamp-circuit by the weight of the attached rod, clutch, and plunger and to assume the position illustrated in Fig. I. In this position of the operating coil portions the connecting-rod J is adjusted in length to permit the ring-clutch to drop, so as to free the carbon passing through it, the tailpiece, which is preferably provided at its end with a small downwardly-projecting lug or screw $k'$, resting upon the upper surface of the cap $c^2$, as shown in Figs. I and IV. The two carbons are now in contact, and on the admission of the current into the lamp-circuit the stationary portion of each divided coil attracts its respective movable portion, thereby producing two forces acting in opposite directions upon the opposite ends of the rocker—that is, unequal electrical forces acting in the same direction on opposite ends of said rocker-arm. Such forces cause the rocker-arm to rotate upon its axis and to draw the rod J and clutch K upwardly into the position shown in Fig. II. The first portion of the upward movement of the clutch is not attended by a corresponding movement of the carbon by reason of the difference between the inner diameter of the clutch-ring and the diameter of the surrounded carbon, the grip not being effected until after a considerable upward movement of the clutch has been effected. During this first upward movement of the clutch the latter moves upon the end of the tailpiece as a fulcrum, producing a compression in the dash-pot prior to the grip of the carbon. The upward movement of the clutch effects the upward movement of the plunger L and causes a further compression of air in the dash-pot, such compressed air, however, escaping slowly from between the two contiguous cylindrical surfaces. Such compression retards the upward movement of the carbon and hence permits the ends of the latter to attain their maximum heat before the full length of the arc is attained. The compressed air acting downwardly upon one side of the clutch opposite that on which an upward pull is being exerted by the rod J the clutch is caused to obtain a firm grip on the carbon, thereby preventing the latter from becoming loosened by jarring or by the movement of the lamp. The dash-pot, in addition to exerting its retarding function, also serves to prevent the clutch from emitting objectionable noises on gripping the carbon, such gripping taking place slowly and hence quietly, at the same time attended with great firmness. As the resistance in the circuit formed by the arc becomes greater as the carbons recede from each other on the movement of the operating coil portions, the quantity of current becomes less until the said portions assume a stationary position corresponding with the maximum length of arc. A drop in the current hence causes the operating coil portions to recede from their respective stationary portions and the carbons to approach, thus maintaining a constant arc. The use of the extended cores extends the magnetic field of the respective stationary portions, and it is seen that the operating portions are within such field at all times throughout their movement. Such arrangement hence produces a magnetic field which is characterized by a zone of an intensity in a plane removed from its coil portion as great as that in a plane less far removed from said portion, the movable coil portion being always located and movable in such zone. Such zone I have found to be of substantially-uniform intensity throughout when alternating currents are used and of greater intensity at the extreme end of the core than at points intermediate of such end and the coil portion when continuous currents are used. The rapid diminution of the intensity of the field as the operating coil portions recede is thus prevented, and hence extremely-small variations in the current will change the position of the upper carbon, and the amount of force exerted upon the operating coil portions will not vary between great limits during their passage from one extreme point of movement to the other. The use of the dash-pot prevents the carbons from being drawn beyond the maximum point at which the arc can be maintained at the available voltage, when a sudden decrease in the resistance of the arc through any cause would otherwise cause the carbons to rapidly part and so tend to be carried beyond such maximum point by the momentum of the moving mechanism. During the maintenance of the arc the pressure which has been produced in the dash-pot gradually becomes zero as a result of the leakage, as before mentioned, between the plunger and inner surface of the pot, thereby relieving the operating coil portions from the necessity of continually maintaining their positions against such pressure at the expense of consumption of electric energy. On the discontinuance of the current the clutch and carbon immediately drop, the free and rapid downward movement of the plunger being permitted by the opening of the relief-valve. In this case the divided coils act as choke-coils, and each such may be termed a "choke-coil" actuator.

It is seen from the above-described construction and the method of connecting the coils that the regulating mechanism is adapted for use in continuous as well as alternating current work.

By reversing the connections of coil portions G and G' or of E and E' so as to cause the current to travel in opposite directions in the respective divided portions of each coil and by attaching the connecting-rod to the rocker-arm on the opposite side of its axis of rotation a like result will be obtained by effecting a receding movement on the part of each movable portion of each coil with respect to its respective stationary portion, repelling forces being in this case substituted for the attracting forces in the first-described case, such repelling forces being substantially equal in strength to said attracting forces. In the second case, however, it is seen that the position assumed by the rocker-arm during the time of passage of no current would be that shown in Fig. II.

The last-described arrangement would present one advantage over that of the first, in that should a short circuit accidentally occur in the operating portions when used for alternating-current work a heavy flow of induced current would be set up therein, thereby increasing its repelling power and at the same time decreasing the impedance of the stationary coil portions. This would merely involve the maintenance of a longer arc at higher voltage, whereas in the first case such short-circuiting would be in a direction opposite that of the flow of the current, and hence decrease the attracting power of the coil portions. Attraction of the one operating coil portion and repulsion of the other may hence also be produced, in which case the arrangement of the stationary coil portions would be as shown in Fig. V, the rocker-arm being shown in the position assumed when no current is traversing the lamp-circuit.

For use in multiple circuits carrying alternating currents of exceedingly-low potential, such as are used in stereopticons and searchlights, a fourth coil portion $E^3$ may be added. Portions G and G' may be cut out of the circuit, connected in series, and short-circuited with portions $E^3$ and $E^2$, respectively, as shown in diagrammatic view, Fig. VIII. The windings and connections between portions G and $E^3$ and between portions G' and $E^2$ are such as to cause the currents in each pair of short-circuited coils to travel in the same direction, thereby producing attracting electric forces between the stationary and movable portions. The current flowing in said portions being induced currents, repelling electric forces will be set up between said movable portions and the adjacent stationary coils E and E', these latter coils being connected in series with the arc, as shown.

When it is desired to obtain a higher voltage at the arc than is obtainable in the line, the connections are made as follows: In this case, as in the preceding one, the two additional portions $E^2$ and $E^3$ are supplied. Portions G, $E^3$, G', and $E^2$ are connected in series with the line in a manner such as to produce attracting forces between the movable and stationary portions of the divided coils so formed. Coils E and E' are connected in series with the arc, as shown in diagrammatic view, Fig. IX. Such arrangement induces a current in coils E and E' in the arc-circuit, and hence sets up repelling forces between said coils and the adjacent movable portions of the divided coils. In operation such arrangement of the mechanism may be caused to act as a step-up transformer, the current passing through the divided coils inducing a secondary current in the coils E and E', the operating portions being repelled by coils E E' and attracted by portions $E^2$ and $E^3$. Such arrangement is particularly adapted for series alternating work, one particular advantage being that in case of the opening of the secondary circuit as a result of the total consumption of the carbons the impedance becomes so great as to prevent a heavy flow of current and consequent burn outs. In this case the relative number of ampere-turns in the primary and secondary circuits are arranged to give the desired voltage at the arc. When no current is flowing, the carbons are in contact and the secondary circuit is short-circuited through the said carbons. On admission of the current through the primary circuit the operating coil portions are operated, thereby lifting the upper carbon and forming the arc. As the carbons are consumed, or if for any other reason the resistance of the arc is increased, the amount of current in the secondary circuit is decreased, thereby increasing the impedance of the primary circuit in proportion, causing less repelling force to act upon the operating coil portions and allowing them to approach the stationary coils, permitting the upper carbon to descend. Should the secondary circuit be opened either by a switch or the entire consumption of carbons or if the carbon should become "hung up," the impedance of the primary circuit will be increased and will act as a choke-coil.

In the last-described arrangement the shunt, cut-out, and automatic current-regulator now used in series alternating work are dispensed with and the dangers attending the handling of a lamp on a grounded line eliminated.

In all the constructions above described it is readily understood that the hanger H is always secured to that arm which on the passage of the current moves in the direction required to separate the carbons.

By the use of the divided coil I am enabled to reduce the cross-section of the coils, decrease the size and hence the weight of the upper portion of the lamp, and obtain sufficient power for forming the arc, at the same time reducing the weight of the moving coil portions and hence the frictional resistance occasioned by their movement to a minimum and dispense with the choke-coil or transformer necessary in low-tension multiple alternating circuits and with the use of springs for deadening noises.

Heretofore difficulty has been occasioned in the use of a dash-pot and plunger as a result of the heating of the lamp mechanism and the consequent unequal expansion of the two, resulting in the jamming of the plunger in the dash-pot. This difficulty I have overcome by making the plunger hollow and leaving its lower portion open, as illustrated in Fig. VI. Such construction permits the air to circulate on the inside of the plunger and maintain the temperature of its walls at a degree substantially equal to that of the dash-pot walls, whereby the two are caused to expand in substantially-equal degrees. It is thus seen from the above that my divided coil may be used in any case where electrical energy is required to be transformed into mechanical movement, such movement being obtainable from any type of current. The impedance is practically the same for all positions of the movable coil portion, so that changes in the current will be responded to by a change of position on the part of the said coil, and hence on the part of the upper carbon. The movable portion may constitute only a small portion of the entire divided coil, so that the amount of energy required to operate it is reduced to a minimum.

Other modes of applying the principle of my invention may be employed instead of the one explained, change being made as regards the mechanism herein disclosed, provided the means covered by any one of the following claims be employed. By this means the use of magnetic conducting materials or metals for the movable portion and which would distort the magnetic field and destroy its uniformity by reason of their conductivity is entirely eliminated and the advantages obtained thereby utilized to form an improved economical construction.

I therefore particularly point out and distinctly claim as my invention—

1. In an arc-lamp, the combination of mechanism for converting electrical energy into mechanical movement and comprising a divided coil consisting of a stationary and a movable portion, said stationary portion provided with a core fixed thereto and projecting therefrom, said movable coil portion surrounding such core and movable in the direction of the axis thereof; an electrical circuit containing the carbons and related to the circuit containing the divided coil in a manner such that changes in the one circuit will produce corresponding changes in the other, and means connecting one carbon with said movable coil portion, whereby such carbon may be actuated to correspond with fluctuations in the current in said divided-coil circuit, substantially as set forth.

2. In an arc-lamp, the combination of mechanism for converting electrical energy into mechanical movement and comprising a divided coil one portion of which is movable and the other portion of which is provided with a magnetic field characterized by a zone of an intensity as great at a plane removed from said coil portion as that in a plane less far removed from said portion, the other portion located and movable in such field; an electrical circuit containing the carbons and means connecting one carbon with said movable coil portion, whereby such carbon may be actuated to correspond with fluctuations in the current in said circuit, substantially as set forth.

3. In an arc-lamp, the combination of mechanism for converting electrical energy into mechanical movement and comprising a divided coil, one portion of which is movable and the other of which is provided with a field characterized by a zone of an intensity in a plane removed from said coil portion as great as that in a plane less far removed from said portion, the other portion located and movable in such field; an electrical circuit including the carbons, and means connecting one carbon with said movable coil portion, the carbon circuit and coil-circuit related in a manner such that the current in the former will control that in the latter so as to cause fluctuations in the arc resistance to produce a movement of the movable coil and a consequent movement of the carbon connected thereto, substantially as set forth.

4. In an arc-lamp, the combination with mechanism for converting electrical energy into mechanical movement and consisting of a primary and a secondary electrical circuit, a divided coil in one of said two circuits one portion of such coil being movable, the other of said circuits containing the carbons, of means connecting one carbon with said movable coil portion whereby such carbon may be actuated to correspond to fluctuations in the current, substantially as set forth.

5. In an arc-lamp, the combination of a ring-clutch for gripping the carbon, means for elevating said clutch connected with one side of the latter, said clutch provided with an extension on the opposite side, and a dash-pot and plunger, the latter connected with said extension at a point intermediate of the extension end and the point of connection of the clutch with said elevating means, substantially as set forth.

6. In an arc-lamp, the combination of a ring-clutch for gripping a carbon, means for elevating said clutch, connected with one side of the latter, said clutch provided with an extension on the opposite side, and a dash-pot and plunger, said plunger connected with said extension at a point intermediate of the extension end and the clutch, substantially as set forth.

Signed by me this 11th day of December, 1899.

ALLYN B. WALTON.

Attest:
D. T. DAVIES,
A. E. MERKEL.